Aug. 6, 1946.　　　　C. NICODEMUS　　　　2,405,161
TRACTOR DRAWN FREIGHT HAULING CAR
Filed Oct. 29, 1943

INVENTOR.
by C. NICODEMUS
ATTYS

Patented Aug. 6, 1946

2,405,161

UNITED STATES PATENT OFFICE 2,405,161

TRACTOR DRAWN FREIGHT HAULING CAR

Clarence Nicodemus, Chauvin, Alberta, Canada

Application October 29, 1943, Serial No. 508,187
In Canada July 30, 1943

8 Claims. (Cl. 280—33.2)

This invention relates to freight hauling cars and particularly to cars or trucks adapted to be tractor drawn.

Up to the present time and particularly in the transportation of large freight loads, it has been the practice to haul such loads by way of a trailer. For instance, in the transportation of heavy, large and bulky equipment, a large platform trailer is sometimes employed, of a kind which not only takes up a lot of space but of a character such that it is only possible to employ the one trailer. This obviously has disadvantages.

On the one hand, the trailer is very large and bulky and on the other, it has no multiple capacity. I have found that it is possible to overcome this difficulty by providing a truck construction which is made of sufficient length to carry loads of the character involved, but which is not bulky in construction and which is adaptable to forming a train of such trucks whereby multiple loads may be carried and controlled and which are only limited by the power of the draw.

It is, therefore, an object of the present invention to provide a freight hauling car or truck which is simple in construction, not bulky, and which may be employed to carry loads limited only by the capacity of the draw.

A further object of the invention is to provide a device of the character specified which may be connected together in a plurality of hauling units to transport multiple loads with the use of only one hauling vehicle.

A still further object of the invention is to provide a device of the character specified, the structure of which will permit either pushing or pulling of the unit or units by reason of the character of their connection.

A still further object of the invention is to provide a construction of the kind specified which by reason of the fact that it includes only two wheels in each unit, has the ability to turn corners at slow tractor speeds under control.

With these and other objects in view, the invention generally comprises a hauling car having a frame formed from side members connected together at one end and rearwardly diverging towards the other end, said other end being connected with an axle for mounting the frame which includes a central draw bar engaging the connected ends of the frame and terminating adjacent to the opposite end of the frame, said draw bar providing a means of coupling a second car to the frame, the latter including connecting means capable of vertically swinging motion and permitting coupling with a towing vehicle or hauling car about a vertical pivot for horizontal swinging action.

Figure 1:
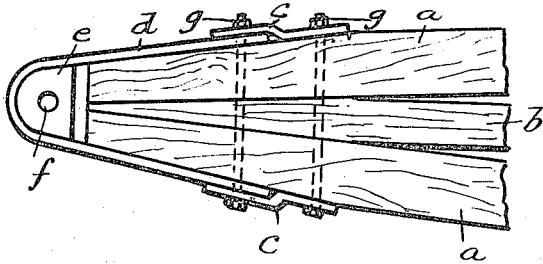
Fig. 1 is a fragmentary top plan view of the draft end of a car or truck.
Figure 2:
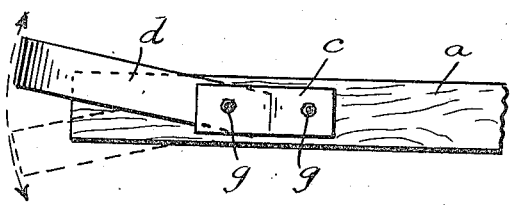
Fig. 2 is a side elevation of Fig. 1.
Figure 4:
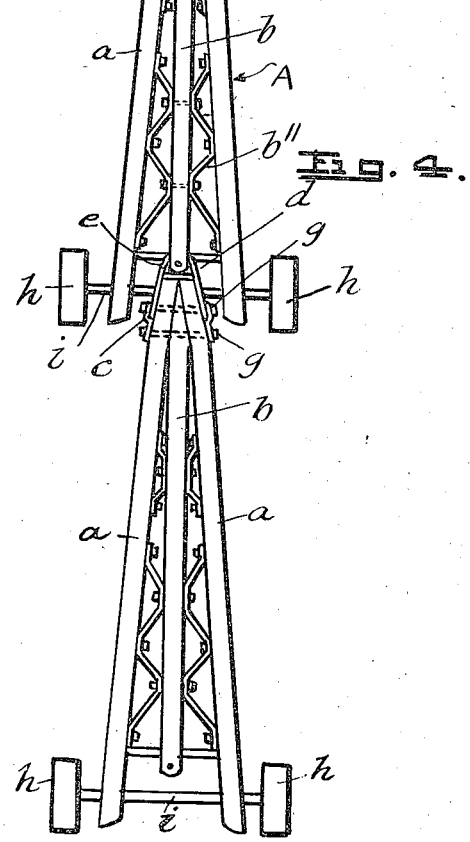
Fig. 4 is a top plan view of two of the cars or trucks coupled together and drawn by a towing vehicle which is shown fragmentarily.
Figure 3:
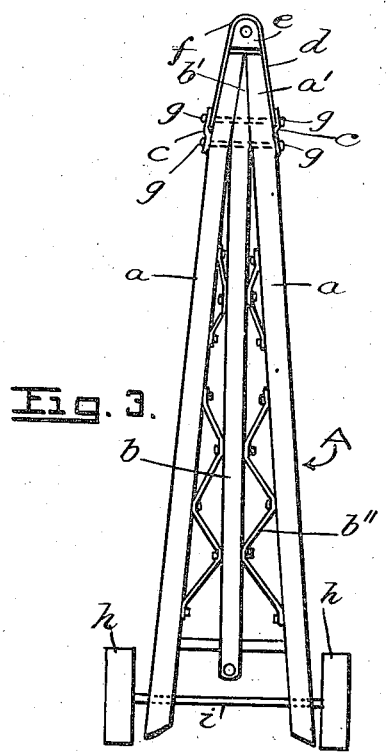
Fig. 3 is a top plan view of a car or truck.

Referring to the drawing, A indicates the truck or trailer as a whole which comprises the longitudinal frame members or sills $a$ which are disposed at an acute angle to one another and diverging from the apex $a'$ where they are connected being spaced apart to the greatest degree at their opposite ends, the spacing being such that the length of the frame members is several times that of the widest portion of the trailer frame. The frame includes central draw bar $b$ which is preferably chamfered to a wedge point as at $b'$ and fits between the converging ends of the frame members $a$. The latter are preferably offset at their connected ends so as to form between them a wedge shaped pocket to receive the chamfered end of the draw bar $b$. The frame members $a$ and draw bar $b$ are fastened together such as by suitable bolts passing through all three members. In this connection, the frame members are provided with the brackets $c$ adjacent the converging connected ends designed to pivotally receive the substantially U-shaped drawing iron $d$. The frame members $a$ and draw bar $b$ are preferably fastened together at the apex of the frame by the bolt members $g$ which also form the means of fastening the brackets $c$ and forming the pivotal connection between the brackets $c$ and the drawing iron $d$. Within the confines of the drawing iron at its free end, a reinforcing filling member $e$ is positioned formed with a bolt hole therethrough to form a means for pivotally connecting the trailer to the towing tractor or other vehicle and likewise for connecting one trailer to the other.

The frame is braced and held in its spaced relationship by means of suitable bracing such as the metal strap members $b''$ of undulating form suitably bolted or otherwise secured between the members $a$ and $b$. The frame is connected at the opposite end to its apex with an axle $i$ and suitable wheels $h$ by means of suitable bearings preferably carried on the lower faces of the frame members or sills $a$. The draw bar preferably terminates short of the axle $i$ and the rear ends of the frame members a so that a second trailer may be connected to the draw bar between the frame members, the connection being by means of a suitable draw pin or bolt passed down through the orificed end of the draw bar b and through the orifice f formed in the filler member e. Thus, a pivotal connection is formed which will permit the trailer to swing into a horizontal plane as well as to pivot vertically.

Accordingly the connected trucks will ride in a natural manner following the character of the terrain over which they are travelling and will follow the direction of the towing vehicle as it may turn. In this latter case the trucks are particularly adapted for tractor hauling and adapted to turn particularly at slow tractor speeds, the trailing trucks being under control at all times by reason of the constructions of the trucks and their connection. Each following truck is connected to the preceding truck at a point between the rear ends of its side sills and therefore one or other of the rearward ends of the side sills may act as a guide when moving around curves tending to maintain the succeeding truck under control and obviating any undue or acute swinging of the following truck.

The central draw bar of each truck is a solid type of coupling which provides for perfect control over the load either pulling or pushing and the truck structure provides for a three point suspension of load, two for the axles and one at the point of connection with the preceding vehicle. The load is limited only by the carrying space involved and the capacity of the wheels or sled runners employed in connection with the truck.

What I claim as my invention is:

1. A freight hauling car comprising a frame including longitudinally extending side members connected together at one end and rearwardly diverging from one another at its rearward end, said frame being connected to an axle at said rearward end, a central draw bar connected to the side members adjacent their point of connection and terminating adjacent the rearward end of said car short of the rearward ends of said side members, the latter flanking the draw bar, means for rigidly supporting said draw bar a connector mounted in conjunction with the connected ends of said frame members and mounted to pivot thereon vertically, said connector including means for pivotally connecting with a towing vehicle for swingable movement in a horizontal plane the rearward end of said draw bar being adapted pivotally to connect with a towed vehicle, said rearward ends of the side members being designed to engage the connecting portion of the towed vehicle when the towed hauling car is towed through an arcuate path whereby to restrict the swinging movement of the towed vehicle.

2. A freight hauling car as claimed in claim 1 in which the frame members are offset and converge towards each other at a more acute angle at the forward end of the truck.

3. A freight hauling car as claimed in claim 1 in which the connector takes the form of a V-shaped member straddling the connecting ends of the side members of the frame and pivoted thereon by means of a connecting bolt.

4. A freight hauling car as claimed in claim 1 in which the connector takes the form of a substantially V-shaped member straddling the connecting ends of the side members of the frame and pivoted thereon by means of a connecting bolt, said V-shaped member having a filling member within the V, said filling member forming a reinforcement for the connector and having a vertically disposed orifice therethrough for the reception of a vertical coupling pin.

5. A freight hauling car as claimed in claim 1 in which bracing means is provided between the side members and the draw bar intermediate the ends of the latter.

6. A freight hauling car comprising a substantially triangular frame having side members connected together at the apex and diverging from one another to a maximum degree at the base of the triangle, an axle mounted on the frame members adjacent the base of the triangle, a draw bar connected to the members at the apex and rearwardly projecting between the side members terminating adjacent to but short of the base of the triangle the rearward ends of said side members projecting beyond the rearward end of said draw bar, means for rigidly mounting said draw bar in said relation, a substantially V-shaped connecting member carried at the apex of the frame straddling the frame member, means for pivoting said connecting member about a horizontal pivot and means in connection with said connecting member for permitting swingable connection with a towing vehicle about a vertical pivot the rearward end of the said draw bar being formed pivotally to connect with a towed vehicle, the latter being designed to engage the rearwardly projecting ends of the side members when said towed car moves through a curve, whereby to guide the towed vehicle.

7. A train of freight hauling cars, each comprising a frame including longitudinally extending side members connected together at one end and rearwardly diverging from one another, said frame being connected to an axle at its rearward end and a central draw bar connected to the side members adjacent their point of connection and terminating adjacent to but short of the rearward end of said car, the rearward ends of said side members projecting beyond the rearward end of said draw bar, means for rigidly supporting said draw bar, a connector mounted in conjunction with the connected ends of said frame members and mounted to pivot thereon vertically, said connector including means for pivotally connecting with a towing vehicle for swingable movement in a horizontal plane, the forward converging ends of said cars being disposable between the rearward ends of the side members of a corresponding car and pivotally connecting with the rearward end of the draw bar of the adjacent corresponding car forwardly of said rearward ends of the side members, the latter forming guide members to engage a forward part of a connected car to guide the connected car when said cars move through a curve.

8. A train of freight hauling cars, as claimed in claim 7, in which the rearward end of the draw bar of each car is disposed forwardly of the rear axle of each car, said axle being supported from the side members adjacent to their rearward ends, said axle being disposed to limit downward swinging movement of the forward end of a connected car when the latter moves in a vertical plane.

CLARENCE NICODEMUS.